(12) United States Patent
Liverance et al.

(10) Patent No.: US 9,128,670 B2
(45) Date of Patent: Sep. 8, 2015

(54) REMOVABLE BATTERY OF COMPUTING DEVICE

(75) Inventors: Fletcher Liverance, Kent, OH (US); John P. McCarthy, Pleasanton, CA (US); John William Pennington, Jr., Mountain View, CA (US); Kenneth Chan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 13/361,956

(22) Filed: Jan. 31, 2012

(65) Prior Publication Data

US 2013/0193758 A1    Aug. 1, 2013

(51) Int. Cl.
*H02J 3/10* (2006.01)
*G06F 1/16* (2006.01)
*H02J 7/00* (2006.01)
*H02J 7/02* (2006.01)

(52) U.S. Cl.
CPC ............ *G06F 1/1632* (2013.01); *G06F 1/1635* (2013.01); *H02J 3/10* (2013.01); *H02J 7/0027* (2013.01); *H02J 7/025* (2013.01)

(58) Field of Classification Search
CPC ........... H02J 3/10; H02J 7/025; H02J 7/0027; G06F 1/1632; G06F 1/1635
USPC .................................. 307/104, 150; 361/683
See application file for complete search history.

(56) References Cited

U.S. PATENT DOCUMENTS

2003/0179542 A1   9/2003   Chien et al.
2005/0213297 A1   9/2005   Ulla et al.

*Primary Examiner* — Hal Kaplan
(74) *Attorney, Agent, or Firm* — Hewlett-Packard Patent Department (57) ABSTRACT

A computing device including a mounting component at a panel of the computing device to couple with a docking stand for a removable battery of the computing device to electrically couple and receive power from the docking stand and the removable battery supplies power to the computing device if the computing device decouples from the docking stand.

20 Claims, 5 Drawing Sheets

REMOVABLE BATTERY OF COMPUTING DEVICE

BACKGROUND

When powering a computing device, a user can access a power source and couple the power source to a power port of the computing device with a power cable. If the computing device includes a battery, the battery can be charged while the computing device is coupled to the power source. The power cable, the power port, and/or the power source can be damaged if a person steps on or trips over the power cable. Further, the computing device can be damaged or the person can be injured if the person trips over the power cable.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A computing device can include a removable battery coupled to a panel of the computing device. For the purposes of this application, a removable battery is a removable hardware component including electrochemical cells to receive and/or store electric power from a docking stand. In one embodiment, the removable battery is coupled to a rear panel or a bottom panel of the computing device. A mounting component can be included on the panel of the computing device corresponding to where the removable battery is coupled and is used to couple the computing device to the docking stand such that the removable battery directly and electrically couples with the docking stand. In one embodiment, the mounting component is a VESA (video electronics stands association) mount and/or an electromagnetic mount.

By coupling the computing device to the docking stand such that the removable battery electrically couples with the docking stand, the docking stand can transfer electric power to the removable battery for the removable battery to use and/or store. As a result, if the computing device decouples from the docking stand, the removable battery can provide power to the computing device for the computing device to remain operational. While the computing device remains operational, the computing device can enter a lower power state to reduce power consumption from the removable battery. In one embodiment, the computing device further writes a state of the computing device to a storage component to save data and/or files of the computing device.

Figure 1:
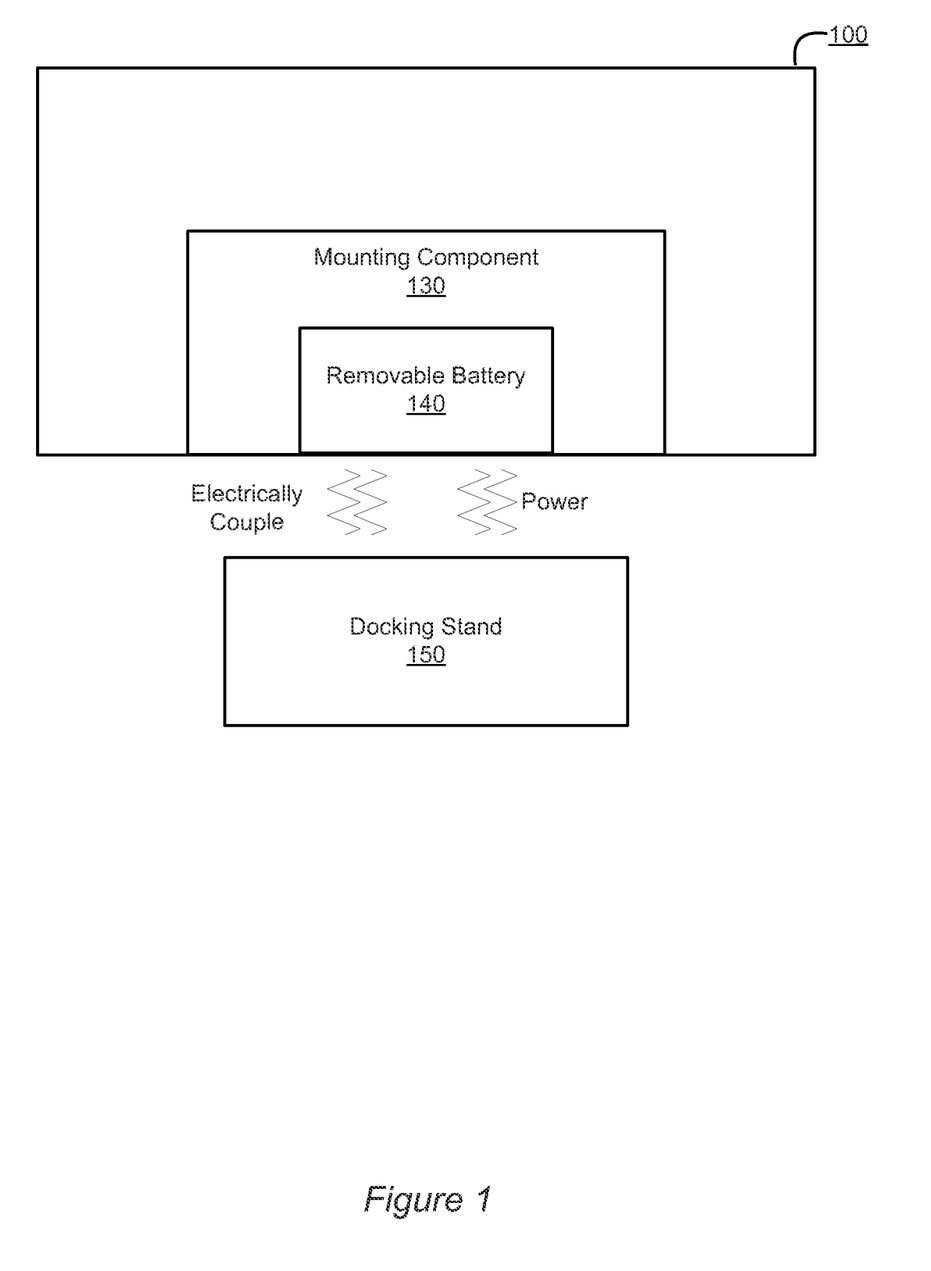
FIG. 1 illustrates a computing device with a removable battery and a mounting component to couple with a docking stand according to an example.

FIG. 1 illustrates a computing device 100 with a removable battery 140 and a mounting component 130 for the computing device 100 to couple with a docking stand 150 according to an example. The computing device 100 can be a laptop, a notebook, a tablet, a netbook, and/or an all-in-one system. In another embodiment, the computing device 100 can be a cellular device, a PDA (Personal Digital Assistant), an E (Electronic)—Reader, and/or any additional computing device including a removable battery and a mounting component 130 to couple with a docking stand 150.

The computing device 100 can include a chassis with one or more panels. A chassis includes a frame, an enclosure, and/or a casing of the computing device 100. One or more panels can include a front panel, a rear panel, a top panel, and/or a bottom panel of the computing device 100. The removable battery 140 can be coupled to a panel of the computing device 100. In one embodiment, the panel includes a cavity to receive and/or house the removable battery 140. The cavity can be a space or compartment of the computing device 100 which can receive and/or couple the removable battery 140 to the computing device 100.

For the purposes of this application, the removable battery 140 is a removable hardware component of the computing device 100 which can include one or more electrochemical cells to receive and store electric power. The removable battery 140 can receive electric power from a docking stand 150 if the computing device 100 is coupled to the docking stand 150. The docking stand 150 is coupled to the computing device 100 with a mounting component 130. The mounting component 130 is a hardware component included at the same panel of the computing device 100 where the removable battery 140 is located.

The mounting component 130 engages and couples the docking stand 150 to the panel of the computing device 100. In one embodiment, the mounting component 130 is located at a rear panel of the computing device 100 and includes a VESA (video electronics stands association) mount to directly couple the docking stand 150 to the rear panel of the computing device 100. In another embodiment, the mounting component 130 includes an electromagnetic component located at a bottom panel of the computing device 100 to directly couple the docking station 150 to the bottom panel of the computing device 100.

If the docking stand 150 is coupled to the panel of the computing device 100, an interface component of the removable battery 140 can interface and electrically couple to the docking stand 150. For the purposes of this application, the removable battery 140 is directly and electrically coupled to the docking stand 150 if the interface component of the removable battery 140 contacts or is within proximity of the docking stand 150 to receive electric power transferred from the docking stand 150. The interface component can be a port, a coil, and/or any additional component which can receive electric power from the docking stand 150 and transfer the electric power to one or more electrochemical cells of the removable battery 140.

For the purposes of this application, the docking stand 150 is a device which supplies power to the removable battery 140 if the docking stand 150 is coupled to the computing device 100. The docking stand 150 can be coupled to a battery and/or a power source, such as an electrical wall outlet. The electric power from the battery and/or power source of the docking station 150 can be transferred through a docking interface for the removable battery 140 to store. The removable battery 140 can receive power from the docking station 150 until the removable battery 140 is full or until the computing device 100 decouples from the docking stand 150. In one embodiment, the computing device 100 is decoupled from the docking stand if the removable battery 140 is not electrically coupled to the docking stand 150.

If the computing device 100 decouples from the docking stand 150, the removable battery 140 can be used to power the computing device 100 and/or one or more components of the computing device 100. In one embodiment, the computing device 100 additionally transitions into a lower power state if the computing device 100 decouples from the docking stand 150. The computing device 100 is in a lower power state if one or more components of the computing device 100 is powered down and/or if an operating speed of one or more components of the computing device 100 is decreased. As the computing device 100 is in the lower power state, the removable battery 140 can be used to power the computing device 100 and/or one or more components of the computing device 100.

Figure 2A:
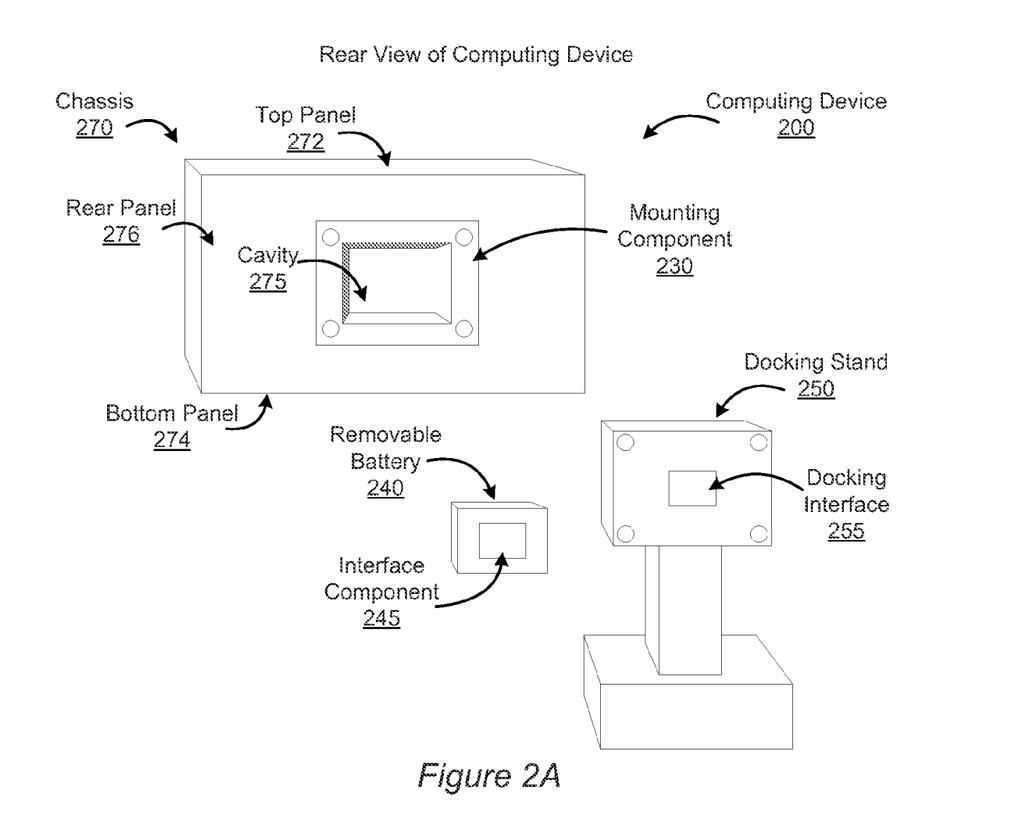
FIG. 2A and FIG. 2B illustrate views of a computing device according to examples.

FIG. 2A illustrates a rear view of a computing device 200 according to an example. As noted above, the computing device 200 can be a tablet, an all-in-one system, a laptop, a notebook, a netbook, a cellular device, a PDA, are E-Reader, and/or any additional computing device including a removable battery 240 and a mounting component 230 to couple with a docking stand 250. The computing device 200 includes a chassis 270, such as a frame, an enclosure, and/or a casing to house one or more components of the computing device 200. In one embodiment, a composition of the chassis 270 can include an alloy, a plastic, a carbon fiber, a fiberglass, and/or any additional element or a combination of elements in addition to and/or in lieu of those noted above.

The chassis 270 can include a top panel 272, a bottom panel 274, a rear panel 276 and/or a front panel 278 of the computing device 200. As noted above, a panel of the computing device 200 can include a cavity 275, such as a space and/or a compartment to receive and/or house the removable battery 240. In one embodiment, the cavity 275 includes a locking component to secure the removable battery 240 to the cavity 275 and/or to the panel of the computing device 200. The locking component can include a latch and/or a spring lock. As shown in the present embodiment, the cavity 275 can be located at the rear panel 276 of the computing device 200. In another embodiment, the cavity 275 can be located at the bottom panel 274 of the computing device 200.

A mounting component 230 of the computing device 200 can couple a docking stand 250 to the computing device 200. The mounting component 230 is a hardware component included on a panel of the computing device 200. In one embodiment, the mounting component 230 includes a VESA (video electronics standards association) mount to couple with a VESA interface of the docking stand 250. In another embodiment, the mounting component 120 includes an electromagnetic component to couple with the docking stand 250. In other embodiments, the mounting component 230 can include one or more latches and/or any additional device to couple the docking stand 250 to the computing device 200.

The mounting component 230 can be located on the same panel of the computing device 200 as the cavity 275. As shown in the present embodiment, both the cavity 275 and the mounting component 230 can be included on the rear panel 276 of the computing device 200. The mounting component 230 can outline or surround a perimeter of the cavity 275. In another embodiment, instead of being included on a panel of the computing device 200, the mounting component 230 can be included on a rear panel of the removable battery 240. As a result, the locking component of the cavity 275 secures the removable battery 240 to the cavity 275 or panel of the computing device 200, while the mounting component 230 couples the removable battery 240 and the computing device 200 to the docking stand 250.

If the docking stand 250 is coupled to the computing device 200, the removable battery 240 can directly and electrically couple with the docking stand 250. The removable battery 240 is a removable hardware component which can include one or more electrochemical cells to receive, store, and/or transfer electric power. As shown in FIG. 2A, the removable battery 240 includes an interface component 245 to receive electric power from the docking stand 250. In one embodiment, the interface component 245 includes one or more inductive coils to receive the electric power. In another embodiment, the interface component 245 can include a port and/or any additional component to receive electric power from the docking stand 250.

The docking stand 250 is a hardware device which can couple to the computing device to supply electric power to the removable battery 240. In one embodiment, the docking stand 250 is coupled to a battery, a wall outlet, and/or any additional power source to receive electric power to provide to the removable battery 240. As shown in FIG. 2A, the docking stand 250 includes a docking interface 255 to directly and electrically couple with the interface component 245 to transfer the electric power to the removable battery 240.

As noted above, the removable battery 240 is directly and electrically coupled to the docking stand 250 if an interface component 245 of the removable battery 240 is directly in contact or within proximity of the of the docking interface 255 of the docking stand 250 to receive electric power transferred from the docking stand 250. In one embodiment, the interface component 245 can physically couple and interface with the docking interface 255 to transfer electric power from the docking stand 250 to the removable battery 240. In another embodiment, the interface component 245 can be within proximity of the docking interface 255 for the docking stand 250 to transfer the electric power.

The docking interface 255 can include an inductive charger and/or an electromagnetic antenna to transfer the electric power from the docking stand 250 to the interface component 245. In another embodiment, the docking interface 255 can include a port and/or any additional component to transfer the electric power to the interface component 245. In response to the interface component 245 receiving electric power, the removable battery 240 can store the received electric power. The removable battery 240 can continue to collect and store the electric power until the removable battery 240 is full and/or in response the computing device 200 decoupling from the docking stand 250. The computing device 200 is decoupled from the docking stand 250 if the mounting component 230 is not coupled to the docking stand 250. In another embodiment, the computing device 200 can be determined to be decoupled from the docking stand 250 if the removable battery 240 is not directly and electrically coupled to the docking stand 250.

If the computing device 200 is decoupled from the docking stand 250, the removable battery 240 can be used to power the computing device 200. In one embodiment, the computing device 200 can additionally transition or enter a lower power state if the computing device 200 is being powered by the removable battery 240. Entering the lower power state can include powering off or disabling one or more components of the computing device 200. In another embodiment, entering the lower power state can include reducing an operating speed of one or more components of the computing device 200. If the computing device 200 recouples to docking stand 250 while in the lower power state, the computing device 200 can resume from the lower power state.

Figure 2B:
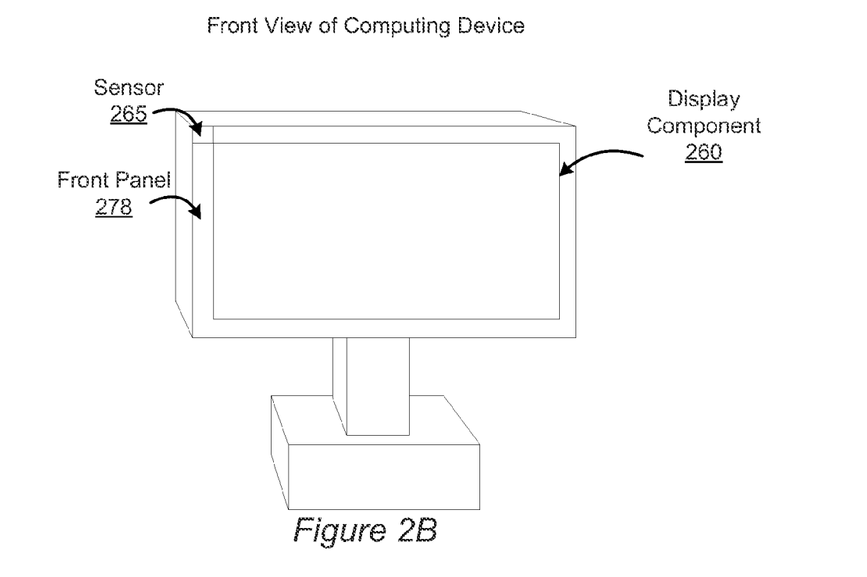

FIG. 2B illustrates a view of a computing device 200 according to another example. As shown in FIG. 2B, the computing device 200 can include one or more components, such as a display component 260 coupled to a front panel of the computing device 200. Disabling and/or powering off one or more components as the computing device 200 enters the lower power state can include powering off the display component 260. The display component 260 is a hardware output component which can be housed in the front panel 278 of the chassis 270. The display component 260 displays a user interface for a user of the computing device 200 to view and/or interact with. In one embodiment, the display component 260 is a LCD (liquid crystal display), a LED (light emitting diode) display, a CRT (cathode ray tube) display, a plasma display, a projector and/or any additional device configured to display the user interface. In other embodiments, if the computing device 200 enters the lower power state, an audio component, a network component, a storage component, and/or any additional components of the computing device 200 can be disabled and/or powered down in addition to and/or in lieu of those noted above.

In one embodiment, the computing device 200 can include a sensor 265. The sensor 265 is a hardware component of the computing device 200 which can remain powered on as the computing device 200 is in the lower power state to detect for a user accessing the computing device 200. The sensor 265 can be an image capture component, a touch sensor, a microphone, an input component, and/or any additional component to detect for a user accessing the computing device 200. If the sensor 265 detects the computing device 200 being access, the display component 260 can power on the display a user interface of the computing device 200 as the computing device 200 remains in the lower power state. In other embodiments, additional disabled or powered off components of the computing device 200 can be enabled or powered on in response to the sensor 265 detecting the computing device 200 being accessed.

Figure 3A:
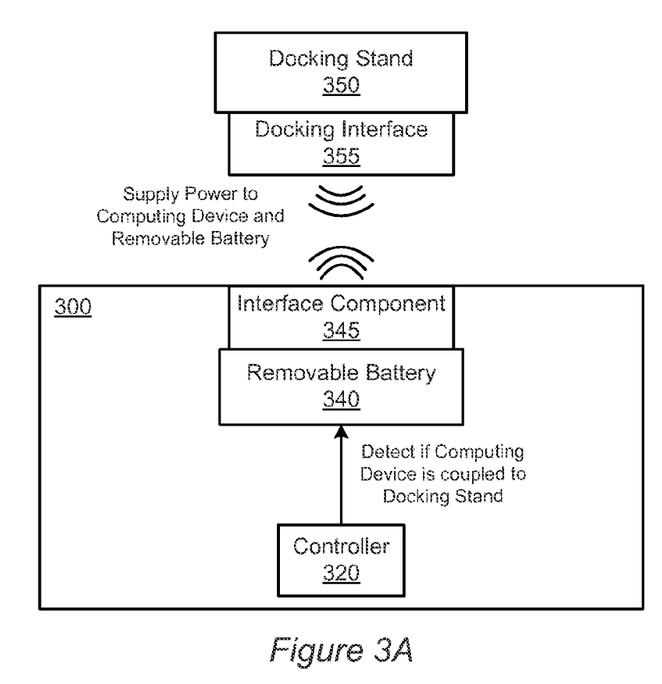
FIG. 3A illustrates a block diagram of a removable battery receiving power from a docking stand according to an example.

FIG. 3A illustrates a block diagram of a removable battery 340 receiving power from a docking stand 350 according to an example. As noted above, an interface component 345 can directly and electrically couple to a docking interface 355 of the docking stand 350 to receive electrical power if the docking stand 350 is coupled to the computing device 300. In one embodiment, the computing device 300 includes a controller 320 to manage the computing device 300. The controller 320 can manage the computing device 300 by detecting if the computing device is coupled to the docking stand 350.

In one embodiment, the controller 320 can poll the interface component 345 to determine if the interface component 345 continues to be electrically coupled to the docking interface 355. If the interface component 345 notifies the controller 320 that the interface component 345 is not electrically coupled to the docking interface 355, the controller 320 will determine that the computing device 300 is decoupled from the docking stand 350. In another embodiment, the mounting component of the computing device 300 can include a mounting sensor to detect if the docking stand 350 is coupled to the mounting component. If the mounting sensor notifies the controller 320 that the mounting component is not coupled to the docking stand 350, the controller 320 determines that the computing device 300 is decoupled from the docking stand 350.

Figure 3B:
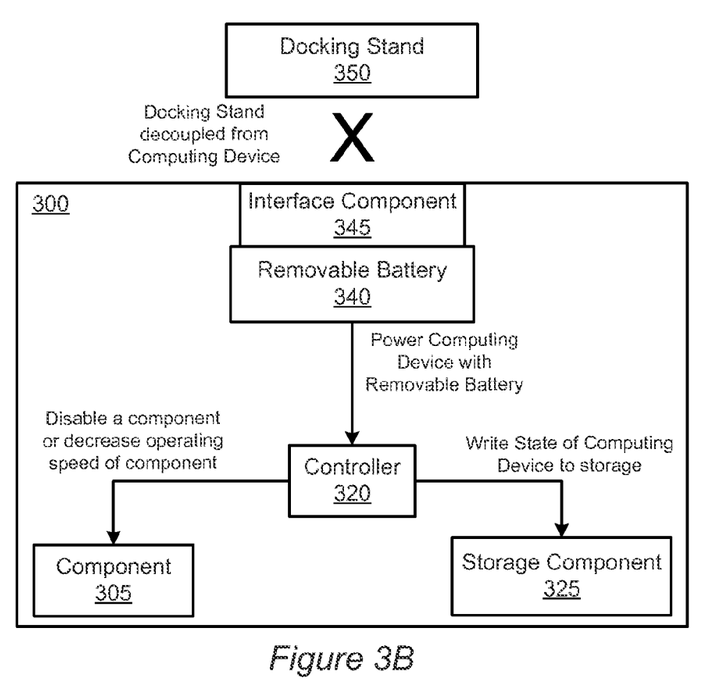
FIG. 3B illustrates a block diagram of a removable battery powering a computing device according to an example.

FIG. 3B illustrates a block diagram of a removable battery 340 powering a computing device 300 according to an example. As noted above, if the docking stand 350 is not coupled to the computing device 300, the removable battery 340 can be used to power one or more components of the computing device 300. The controller 320 can then enter and/or transition the computing device 300 to the lower power state by disabling one or more components 305 of the computing device 300. The controller 320 can additionally reduce an operating speed of one or more components 305 of the computing device 300.

In one embodiment, the controller 320 further writes a state of the computing device 300 to a storage component 325 of the computing device 300 as to preserve files and data of the computing device 300. The storage component 325 can be a non-volatile computer readable memory which can write, store, or communicate the state of the computing device 300. In one embodiment, the storage component 325 is a hard drive, a compact disc, a flash disk, a network drive or any other form of tangible apparatus coupled to the computing device 300. The controller 320 can write the state of the computing device 300 as an image. Additionally, the state of the computing device 300 can include one or more applications, files, process, and/or resources which are running or operating as the computing device 300 is in the lower power state.

In one embodiment, the controller 320 can additionally determine if the computing device 300 recouples to the docking stand 350. The computing device 300 recouples to the docking stand 350 if the interface component 345 of the removable battery 340 electrically couples to the docking interface 355 and receives electrical power from the docking stand 350. If the computing device 300 recouples to the docking stand 350, the controller 320 can transition the computing device 300 from the lower power state by enabling or powering on one or more disables components of the computing device 300. In another embodiment, the controller 320 can increase an operating speed of one or more components of the computing device 300.

Figure 4:
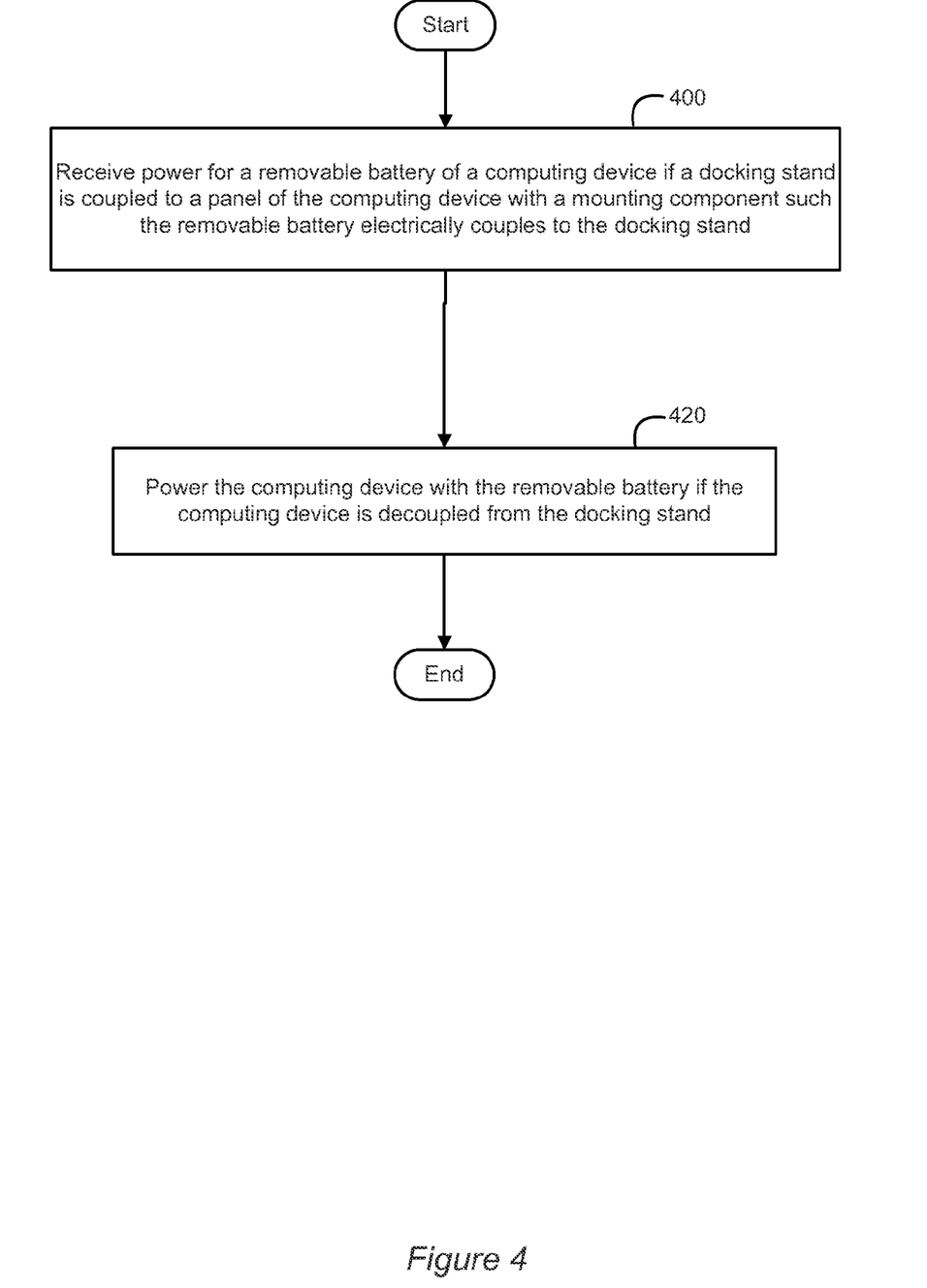
FIG. 4 is a flow chart illustrating a method for managing a computing device according to an example.

FIG. 4 is a flow chart illustrating a method for managing a computing device according to an example. Managing the computing device can include receiving power for a removable battery of a computing device if a docking stand is coupled to a panel of the computing device with a mounting component such the removable battery electrically couples to the docking stand at 400. As noted above, the panel can be a rear panel of the chassis and the panel can include a cavity to receive and/or house the removable battery. In one embodiment, the mounting component surrounds a perimeter of the cavity on the panel. In another embodiment, the mounting component is included on a rear surface of the removable battery.

The mounting component can include a latch, a VESA mount, and/or an electromagnetic component to couple the computing device to the docking stand. Once the docking stand has been coupled to the computing device, the removable battery can receive electric power from the docking stand through an interface component at. The received power can be stored on the removable battery until the removable battery is full and/or until the computing device is decoupled from the docking stand. If the docking stand is decoupled from the computing device, the removable battery can be used to power the computing device at 420. The method is then complete. In other embodiments, the method of FIG. 4 includes additional steps in addition to and/or in lieu of those depicted in FIG. 4.

Figure 5:
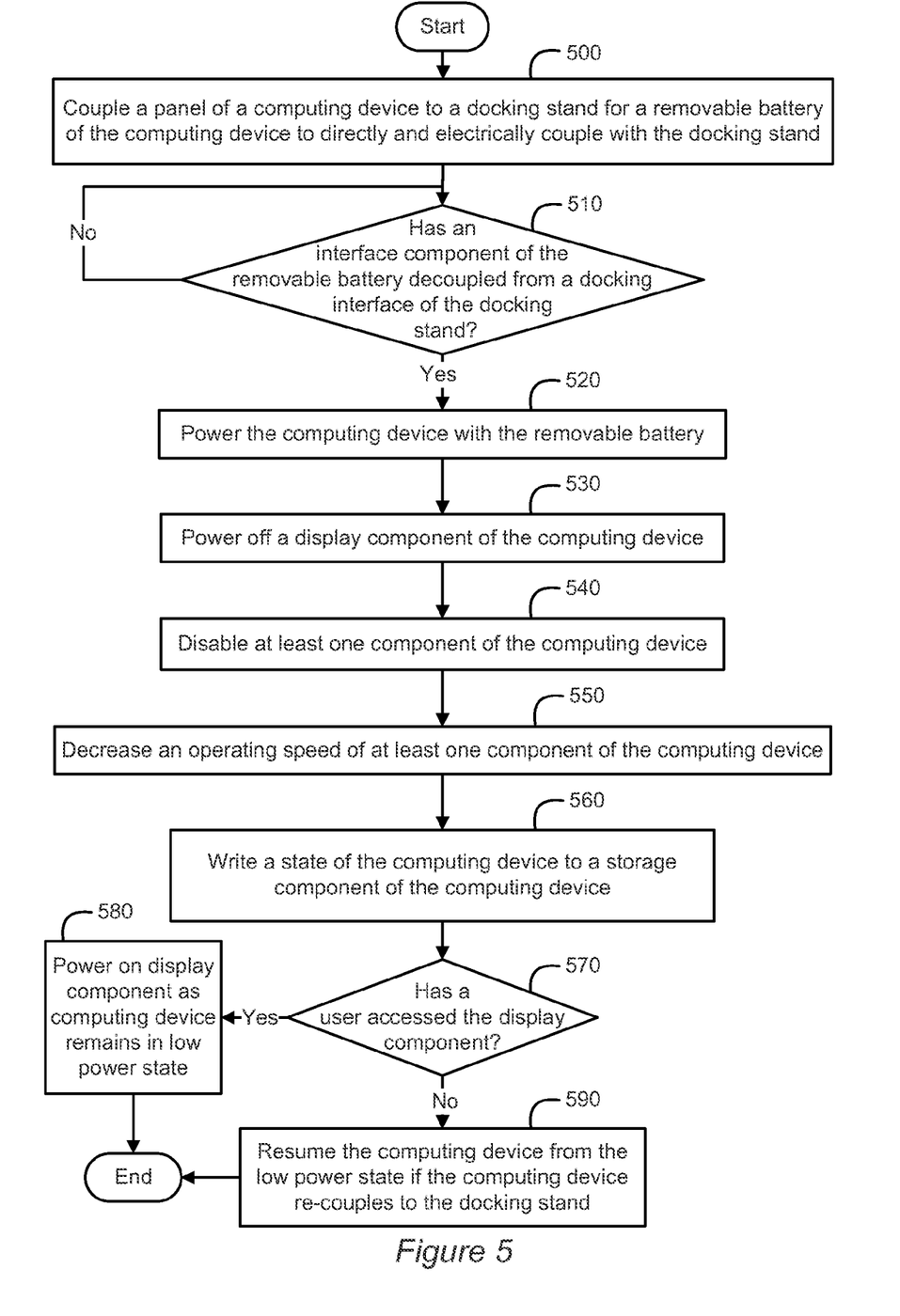
FIG. 5 is a flow chart illustrating a method for managing a computing device according to another example.

FIG. 5 is a flow chart illustrating a method for managing a computing device according to an example. As noted above, a docking stand can initially be coupled to a panel of the computing device for a removable battery of the computing device to directly and electrically couple with the docking stand at 500. In one embodiment, the removable battery is coupled to a rear panel of the computing device and a mounting component couples the docking stand to the rear panel such that a docking interface of the docking stand directly couples and interfaces with an interface component of the removable battery. Directly coupling and interfacing can include the interface component physically touching the docking interface. In another embodiment, directly coupling and interfacing can include the interface component being within proximity of the docking interface. If the interface component is electrically coupled to the docking interface, the docking stand can transfer power to the removable battery.

As noted above, the computing device can additionally include a controller. The controller can determine if the computing device has decoupled from the docking stand by determining if the interface component is decoupled from the docking interface at 510. The controller can poll the interface component to determine if continues to be electrically coupled to the docking interface. In another embodiment, the mounting component can include a mounting sensor which can detect if the mounting component is coupled to the docking stand. If the docking stand continues to be coupled to the computing device, the controller can continue to detect if the docking stand continues to be coupled to the computing device at 510.

If the computing device is detected to decouple from the docking stand, the removable battery can be used to power the computing device at 520. Additionally, the controller can proceed to enter and/or transition the computing device to a lower power state. As noted above, entering or transitioning the computing device to the lower power state can include disabling or powering off the display component at 530. The controller can additionally identify one or more components of the computing device to disable or power off at 540. Further, the controller can decrease an operating speed of one or more components of the computing device at 550.

The controller can then write a state of the computing device to a storage component at 560. While the computing device is powered by the removable battery, a sensor can be used to detect if a user is accessing the computing device at 570. If the computing device is accessed, the controller can enable or power on the display component while the computing device remains in the lower power state at 580. In another embodiment, if the computing device recouples to the docking stand, the controller can resume the computing device from the lower power state at 590. The method is then complete. In other embodiments, the method of FIG. 5 includes additional steps in addition to and/or in lieu of those depicted in FIG. 5.

What is claimed is:

1. A computing device comprising:
    a removable battery at a panel of the computing device;
    a mounting component at the panel to couple with a docking stand for the removable battery to directly and electrically couple with the docking stand;
    wherein the removable battery interfaces with the docking stand to receive power from the docking stand and the removable battery supplies power to the computing device if the computing device decouples from the docking stand.

2. The computing device of claim 1 wherein the panel of the computing device includes a cavity to receive the removable battery.

3. The computing device of claim 2 wherein the cavity includes a locking component to secure the removable battery to the panel of the computing device.

4. The computing device of claim 1 wherein the docking stand includes a docking interface to directly and electrically couple with an interface component of the removable battery to supply power to the removable battery.

5. The computing device of claim 4 wherein the interface component of the removable battery includes at least one coil and the docking interface includes an inductive charger to inductively couple with the coil.

6. The computing device of claim 1 wherein the mounting component includes a video electronics standards association (VESA) mount to couple with the docking stand.

7. The computing device of claim 1 wherein the mounting component includes an electromagnetic component to directly couple with the docking stand.

8. The computing device of claim 1 further comprising a controller to power off a display component of the computing device and transition the computing device to a lower power state if the computing device decouples from the docking stand.

9. The computing device of claim 1 further comprising a sensor to detect a user accessing the display component if the computing device is decoupled from the docking stand.

10. The computing device of claim 9 wherein the display component powers on in response to the sensor detecting the user accessing the display component.

11. The computing device of claim 9 wherein the sensor includes at least one of an image capture component, a touch sensor, a microphone, and an input component.

12. A method for managing a computing device comprising:
    receiving power for a removable battery of a computing device if a docking stand is coupled to a panel of the computing device;
    wherein the panel includes a mounting component to couple the computing device to the docking stand such that the removable battery directly and electrically couples to the docking stand; and
    powering the computing device with the removable battery if the computing device is decoupled from the docking stand.

13. The method for managing the computing device of claim 12 wherein the computing device is decoupled from the docking stand if an interface component of the removable battery is not within proximity of a docking interface of the docking stand.

14. The method for managing the computing device of claim 12 further comprising powering off a display component of the computing device and transitioning the computing device to a lower power state if the computing device is decoupled from the docking stand.

15. The method for managing the computing device of claim 14 wherein transitioning the computing device to a lower power state includes disabling at least one component of the computing device.

16. The method for managing the computing device of claim 14 wherein transitioning the computing device to a lower power state includes decreasing an operating speed of at least one component of the computing device.

17. The method for managing the computing device of claim 12 further comprising writing a state of the computing device from a memory to a storage component of the computing device in response to the computing device decoupling from the docking stand.

18. A computing device comprising:
    a chassis with a front panel to include a display component and a rear panel with a cavity to receive a removable battery;

a mounting component to couple the computing device with a docking stand for an interface component of the removable battery to electrically couple and receive power from the docking stand; and a controller to power the computing device with the removable battery and transition the computing device to a lower power state if the interface component of the removable battery is decoupled from the docking stand.

19. The computing device of claim 18 wherein the mounting component is included on a panel of the chassis.

20. The computing device of claim 18 wherein the cavity includes a locking component to secure the removable battery within the cavity.

\* \* \* \* \*